United States Patent [19]

Paul

[11] 4,302,428
[45] Nov. 24, 1981

[54] YELLOWCAKE PROCESSING IN URANIUM RECOVERY

[75] Inventor: James M. Paul, DeSoto, Tex.

[73] Assignee: Mobil Oil Corporation, New York, N.Y.

[21] Appl. No.: 95,188

[22] Filed: Nov. 16, 1979

[51] Int. Cl.$^3$ ............................................. C01G 43/01
[52] U.S. Cl. ...................................... 423/16; 423/260
[58] Field of Search ........................... 423/11, 16, 260

[56] References Cited

U.S. PATENT DOCUMENTS

| | | | |
|---|---|---|---|
| 2,780,515 | 2/1957 | Miller et al. | 423/260 |
| 2,849,284 | 8/1958 | Wigner et al. | 423/16 |
| 2,878,100 | 3/1959 | Googin, Jr. | 423/260 |
| 2,903,334 | 9/1959 | Buckingham | 423/260 |
| 3,453,216 | 7/1969 | Fitch et al. | 423/260 |
| 4,024,215 | 5/1977 | Caropreso et al. | 423/16 |

OTHER PUBLICATIONS

Bailar et al., "Comprehensive Inorganic Chemistry", 5, pp. 229-230 and 249, Program on Press (1973) Oxford.
Mellor, "Inorganic and Theoretical Chemistry", XII, pp. 69-71, Longmans, Green & Co. (1932) London.
Merritt, "The Extractive Metallurgy of Uranium", pp. 247-254, Colorado School of Mines (1971).

*Primary Examiner*—Edward A. Miller
*Attorney, Agent, or Firm*—Charles A. Huggett; Michael G. Gilman; James F. Powers, Jr.

[57] ABSTRACT

A process for the recovery of uranium by precipitation from a rich eluate by contacting the eluate with hydrogen peroxide to produce uranium peroxide yellowcake and reacting the yellowcake with a reducing agent to produce uranium trioxide. The reaction between the yellowcake and the reducing agent may be carried out at a temperature less than 100° C. Subsequent to the reducing step, the uranium trioxide may be washed with water in order to remove water soluble salts present as impurities. Thereafter, the uranium trioxide is dried at a temperature less than 200° C.

6 Claims, No Drawings

YELLOWCAKE PROCESSING IN URANIUM RECOVERY

BACKGROUND OF THE INVENTION

This invention relates to the recovery of uranium and more particularly to a procedure for the conversion of uranium peroxide yellowcake produced by precipitation with hydrogen peroxide to uranium trioxide.

Uranium is produced from uranium bearing ores by various leaching procedures which involve the use of a lixiviant e.g., an aqueous carbonate - bicarbonate solution or acid solution, to leach the uranium from its accompanying gangue material. The leaching operation may be carried out in conjunction with surface milling operations in which the uranium ore is mined and then crushed and blended prior to leaching, heap leaching of ore piles at the surface of the earth, or in situ leaching in which the lixiviant is introduced into a subterranean ore deposit and recovered therefrom through suitable injection and production systems. Typically, the lixiviant contains a suitable oxidizing agent such as oxygen or hydrogen peroxide which oxidizes the uranium to the hexavalent state at which it forms water soluble uranyl complexes such as uranyl carbonate or uranyl sulfate ions.

The pregnant lixiviant produced during the leaching operation is then processed in order to recover the uranium therefrom. Various procedures may be employed. In one technique, a concentrated uranium solution is produced by passing the pregnant lixiviant over an anionic ion exchange resin and then eluting the resin with an eluant in order to desorb the uranium. The eluting procedure produces a relatively concentrated uranium solution, termed the "eluate", from the ion exchange column. Another technique for concentrating the uranium from the pregnant lixiviant involves solvent extraction. In this case the lixiviant is extracted with a suitable solvent and the solvent then subjected to a stripping action in order to recover the uranium in the relatively rich eluate. Regardless of the concentration procedure used, the eluate is then treated to precipitate uranium to produce the familiar "yellowcake". Various precipitation techniques are described in Merritt, R. C., THE EXTRACTIVE METALLURGY OF URANIUM, Colorado School of Mines Research Institute, (1971), in Chapter 7, "Precipitation and Product Preparation". One suitable technique disclosed in Merritt at pages 247 and 248, involves precipitation with hydrogen peroxide. In this case, the eluant after adjustment as necessary to an acidic ph, is treated with a stoichiometric excess of hydrogen peroxide. The resulting uranium peroxide precipitates from the eluant to form yellowcake. The uranium product in the yellowcake may be characterized by the formula $UO_4.XH_2O$, wherein the value of X normally will range from 2 to 4.

Subsequent to the precipitation step, the resulting yellowcake slurry is separated from the decant and then subjected to additional dewatering steps such as centrifuging or vacuum filtration as described in Merritt at pages 248-251. The yellowcake may then be dried and calcined at an elevated temperature in order to form the uranium oxide final product as described in pages 252-254 of Merritt.

SUMMARY OF THE INVENTION

In accordance with the present invention there is provided a new and improved process for the recovery of uranium from a rich eluate which is contacted by hydrogen peroxide in order to precipitate the uranium as a uranium peroxide yellowcake. In carrying out the invention the uranium peroxide yellowcake is reacted with a reducing agent with the resulting production of uranium trioxide. Preferably, the reaction between the uranium oxide yellowcake and the reducing agent is carried out at a temperature less than 100° C.

DESCRIPTION OF THE SPECIFIC EMBODIMENTS

In the course of recovering uranium by hydrogen peroxide precipitation, the yellowcake often contains sodium chloride as an impurity. The sodium chloride may originate from a number of sources. For example, in leaching operations employing a carbonate lixiviant with subsequent concentration by an anionic ion exchange resin, the ion exchange columns may be eluted with an eluant containing sodium chloride in addition to carbonate and bicarbonate ions. In addition, the hydrogen peroxide precipitation procedure typically involves preacidification with hydrochloric acid. After the addition of the hydrogen peroxide, sodium hydroxide is then added to increase the pH of the solution and ensure complete precipitation. Sodium chloride is of course produced as a product of neutralization of the hydrochloric acid by the sodium hydroxide. Additional impurities which may also be present include other water soluble salts such as sodium carbonate and sodium sulfate.

Uranium peroxide exhibits a limited solubility in water, ranging from a few parts per million in cool water, upwards to about 80 parts per million in relatively hot water, e.g. at about 90° C. Thus attempts to remove impurities from uranium peroxide yellowcake by washing with water results in some loss of the uranium itself. Accordingly it is a conventional practice to dry the uranium peroxide and subject it to a calcination procedure at a sufficiently elevated temperature to convert the peroxide to triuranium octoxide.

The calcination procedure often is accompanied by the evolution of chlorine gas. In this regard, the thermal decomposition of uranium peroxide yellowcake to uranium oxide is attended by dehydration, deoxygenation, and, where sodium chloride is present as an impurity, chlorine evolution, at temperatures ranging from about 100° to about 900° C. As the calcination process is begun, dehydration due to removal of the water of crystallization occurs at temperatures within the range of about 100° to 300° C. to produce uranium tetroxide as an intermediate product. At temperatures within the range of about 200° to 500° C., uranium tetroxide is converted to uranium trioxide with the evolution of free oxygen. Also at temperatures of about 300° to 500° C., chlorine gas evolution occurs by the oxidation of the chloride ion to molecular chlorine. At temperatures ranging from about 700° to about 900° C., the uranium trioxide is converted to triuranium octoxide with the evolution of additional oxygen.

The evolution of chlorine gas during calcination of the yellowcake is advantageous in that it reduces the chloride contamination of the final product. However, the chlorine gas evolved is corrosive to the equipment employed in the processing procedure and if released to the atmosphere, it is also harmful to the environment. Chlorine evolution at intermediate temperatures, e.g. on the order of 300° C., occurs readily where the yellowcake is wet. In a typical yellowcake processing plant, the product effluent produced by a clarification step and several centrifuging stages may consist of equal parts of water and solids when passed to the drying and calcination stage. Thus the problems presented by chlorine gas evolution during the drying and calcination stage may be quite severe.

In accordance with the present invention, the evolution of chlorine gas due to chloride oxidation may be avoided by the direct conversion of the uranium peroxide to uranium trioxide. This is accomplished by reaction of the yellowcake produced by the hydrogen peroxide precipitation step with a reducing agent to produce uranium trioxide. Any suitable reducing agent may be employed in carrying out the invention, however, it is preferred to employ sulfite ions as the reducing agent. As noted above, the uranium peroxide yellowcake is normally present in an aqueous slurry when it is passed to the usual drying and calcination stage. Instead of employing the drying and calcination stage at this point, the slurry is directed to a suitable reaction chamber and sulfite ions are formed in the slurry by passing sulfur dioxide gas into the yellowcake slurry. The reduction of the uranium peroxide by employing a sulfite reducing agent may be characterized by the following equation:

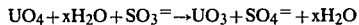

$$UO_4 + xH_2O + SO_3^= \rightarrow UO_3 + SO_4^= + xH_2O$$

The reduction reaction proceeds readily at room temperature conditions and thus there is no need to heat the yellowcake at this stage of the processing. While some heating may be employed to expedite the reaction, it will be preferred to carry out the reduction step at a temperature less than 100° C., well below the point at which chlorine evolution, due to oxidation of chloride will occur.

While as noted above sulfite is the preferred reducing agent, numerous other reducing agents are also available. Thus, reducing agents suitable for carrying out the invention include alkali metal thiosulfates and sulfides such as sodium thiosulfate and sodium sulfide, stannous halides such as stannous chloride, and alkali metal ferrous sulfates such as sodium ferrous sulfate.

In experimental work carried out relative to the invention, a uranium peroxide yellowcake produced by hydrogen peroxide precipitation was subject to sulfite reduction. The yellowcake was in an aqueous slurry consisting of about 50% solids and 50% liquid. The sulfite was produced by bubbling sulfur dioxide into the slurry in an amount to provide a stoichiometric excess of sulfite. The reaction was carried out at room temperature and an immediate color change occurred from yellow to deep orange. The reaction was strongly exothermic. The resulting orange uranium trioxide was found to be very insoluble in the decant solution.

In view of the water insolubility of the uranium trioxide, the product from the reduction reaction may be washed with water without loss of uranium as would occur in the case of uranium peroxide. By this technique water soluble salts such as sodium chloride may be removed at low temperature conditions. Subsequent to the washing procedure, the uranium trioxide may then be dried and calcined at an elevated temperature, e.g. on the order of 700° C. or above, in order to convert it to triuranium octoxide. However, it usually will be preferred to simply dry the uranium trioxide at a moderate temperature of less than 200° C. This technique will provide uranium trioxide of a high degree of purity as the final product.

I claim:

1. In the recovery of uranium from a rich eluate wherein said eluate is contacted by hydrogen peroxide in order to precipitate said uranium as a uranium peroxide yellowcake, the improvement comprising reacting said yellowcake while in an aqueous slurry with a reducing agent to produce uranium trioxide.

2. The method of claim 1 wherein said reducing agent comprises sulfite ions.

3. The method of claim 2 wherein said sulfite ions are provided in situ by passing sulfur dioxide into said aqueous slurry of said yellowcake.

4. The method of claim 1 wherein the reaction between said yellowcake and said reducing agent is carried out at a temperature less than 100° C.

5. The method of claim 1 wherein said uranium trioxide is washed with water to remove water soluble salts present as an impurity from said uranium trioxide.

6. The method of claim 5 further comprising the step subsequent to said washing procedure of drying said uranium trioxide at a temperature less than 200° C.

* * * * *